(12) United States Patent  (10) Patent No.: US 8,633,387 B2
Nachbauer  (45) Date of Patent: Jan. 21, 2014

(54) ELECTRICAL LINE FOR MOTOR VEHICLES

(75) Inventor: Otto Nachbauer, Flob (DE)

(73) Assignee: NEXANS, Paris (FR)

( * ) Notice: Subject to any disclaimer, the term of this patent is extended or adjusted under 35 U.S.C. 154(b) by 400 days.

(21) Appl. No.: 12/610,611

(22) Filed: Nov. 2, 2009

(65) Prior Publication Data

US 2010/0116523 A1    May 13, 2010

(30) Foreign Application Priority Data

Nov. 12, 2008   (EP) ..................................... 08291054

(51) Int. Cl.
*H01R 4/00* (2006.01)
(52) U.S. Cl.
USPC ....................... 174/72 R; 174/72 A; 174/72 C
(58) Field of Classification Search
USPC .................... 174/110 R, 112, 113 R, 115, 116
See application file for complete search history.

(56) References Cited

U.S. PATENT DOCUMENTS

| | | | | |
|---|---|---|---|---|
| 3,057,001 A | * | 10/1962 | Rapata | 16/2.5 |
| 3,928,519 A | * | 12/1975 | Kashiyama et al. | 264/40.7 |
| 4,685,173 A | * | 8/1987 | Pavur | 16/2.2 |
| 5,283,392 A | * | 2/1994 | Ooshima et al. | 174/84 R |
| 5,414,218 A | * | 5/1995 | Nathan | 174/151 |
| 5,563,376 A | * | 10/1996 | Hansell et al. | 174/102 R |
| 5,739,475 A | * | 4/1998 | Fujisawa et al. | 174/153 G |
| 5,981,877 A | * | 11/1999 | Sakata et al. | 174/153 G |
| 6,267,385 B1 | * | 7/2001 | Okamoto et al. | 277/627 |
| 6,402,155 B2 | * | 6/2002 | Sakata | 277/314 |
| 6,825,416 B2 | * | 11/2004 | Okuhara | 174/668 |
| 7,314,999 B2 | * | 1/2008 | Dobler | 174/110 R |

FOREIGN PATENT DOCUMENTS

DE          100 58 204 A1  *  7/2002 ............. B60R 16/02

* cited by examiner

*Primary Examiner* — William H Mayo, III
(74) *Attorney, Agent, or Firm* — Sofer & Haroun, LLP

(57) ABSTRACT

An electrical line (1) for motor vehicles is provided having at least two insulated electrical conductors (4, 5) which are combined to form one unit. The line is connected to a sensor (3) at one end. The conductors (4, 5) are surrounded by a prefabricated plastic tube (6). Parts (7), integrally belonging to the tube (6), are positioned on the outside along the course of the tube (6) as fastening devices for securing the line (1) at predefined fixed points of a motor vehicle. At those fixed points, fastening parts are present that are configured to connect with and that complement the parts (7) of the tube (6).

3 Claims, 2 Drawing Sheets

ELECTRICAL LINE FOR MOTOR VEHICLES

RELATED APPLICATION

This application claims the benefit of priority from European Patent Application No. 08 291 053.0, filed on Nov. 12, 2008, the entirety of which is incorporated by reference.

BACKGROUND

1. Field of the Invention

The invention relates to an electrical line for motor vehicles which has at least two insulated electrical conductors which are combined to form one unit and, when the line is completely fitted, to which a sensor is connected at one end of said line.

2. Description of Related Art

"Lines of this type which are fitted with sensors are used in modern motor vehicles —called "vehicles" for short in the text which follows —in large, continuously increasing numbers for monitoring and display purposes. A "vehicle" may be both a passenger car and a heavy goods vehicle or a trailer. Sensors can be used to monitor and display, for example, the temperature at different points of a vehicle, the anti-lock braking system (ABS), the electronic braking system (EBS), the wear on brake shoes or the tire pressure. Sensors in the form of ultrasonic transducers are also used to measure the distance of a vehicle from an obstacle and to trigger a warning signal. All of these sensors are connected to a central unit, which is present in the respective vehicle, via an electrical line."

Appropriate lines can be combined together with other lines to form a cable harness from which said lines protrude with different lengths. After the cable harness is laid, the lines have to be conducted to the site of use of the respective sensor with an appropriate length and in the process be fastened to the vehicle body or other fixed points of a vehicle. DE 103 10 050 A1 discloses a cable harness of this type, in which a number of insulated electrical conductors is arranged in a plastic corrugated tube. When the corrugated tube is slit, the conductors can be inserted into it. The conductors are drawn into a corrugated tube which is not cut. In order to fasten the corrugated tube and therefore the cable harness, clamps are used which are pressed against the corrugated tube and fixed to a substrate by means of a locking clip or a machine screw.

DE 100 58 204 A1 also discloses a cable harness in which a number of insulated electrical conductors are surrounded by an outer jacket comprising foamed material. A stepped sealing element which likewise comprises foamed material is fitted to one end of the outer jacket, it being possible for said sealing element to be inserted into a passage opening in a metal vehicle body panel. The outer jacket and the sealing element can be produced together in a standard foaming process.

The need for fastening to the vehicle body or other fixed points of a vehicle also applies, particularly, for lines which are laid, for example, individually from the central unit to the site of use of the sensor. In this case, appropriate fixed points are located not only within the body of a vehicle but, for example, also outside on the floor of said vehicle or in wheel arches. The lines have to be designed to be robust and sufficiently mechanically stable for all sites of use. In order to protect the conductors, they have, for example, a common jacket comprising insulating material which surrounds said conductors. They are generally fastened at fixed points in the vehicle—as disclosed in DE 103 10 050 A1—using additional fastening elements, it also being possible for parts of a fastening device to also be mounted on the outside of the line beforehand, these parts interacting with corresponding parts which are present at the fixed points.

OBJECTS AND SUMMARY

The invention is based on the object of designing the line described in the introduction in such a way that it has a simplified construction and can be produced in a simpler manner.

This object is achieved in, accordance with the characterizing features of Patent claim 1.

The essential advantage of this line is that a prefabricated tube for accommodating the insulated conductors is used, said tube being integrally fitted with all the parts required to fasten the line to or in a vehicle. In this case, is also possible to design the tube additionally such that it is thickened at predefined points in order to provide protection against mechanical loads, for example abrasion, which occur during operation of the vehicle. At other, likewise predefined, points, the wall thickness of the tube can also be reduced in order to improve its flexibility. Overall, the tube provides effective mechanical protection for the surrounded conductors. It has the further essential advantage that the conductors can be drawn into the tube, for example as insulated individual conductors which can already be fitted with electrical contact parts at their ends. Advance connection of the conductors to form an integral unit, and the corresponding outlay, for example by a common jacket, is no longer necessary in the case of this line.

BRIEF DESCRIPTION OF DRAWINGS

An exemplary embodiment of the subject matter of the invention is illustrated in the drawings, in which.

DETAILED DESCRIPTION

Figure 1:
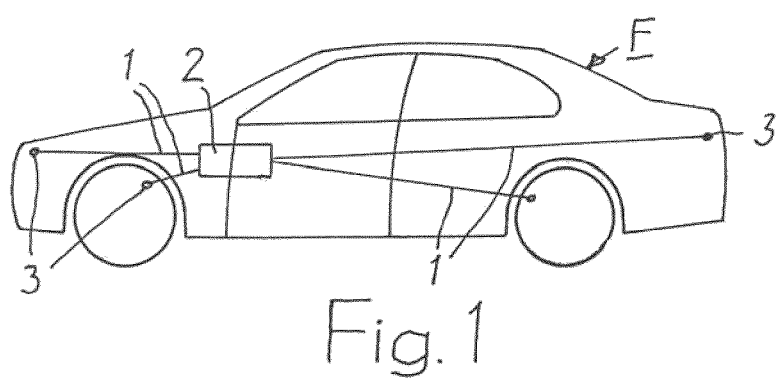
FIG. 1 shows a purely schematic illustration of a vehicle with lines laid therein.
Figure 2:
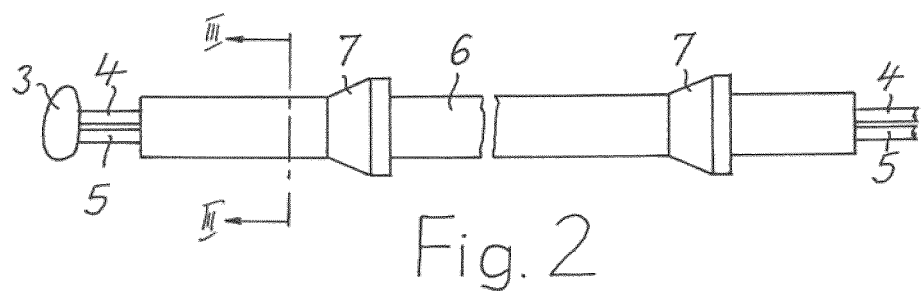
FIG. 2 likewise shows a schematic illustration of a line according to the invention.
Figure 3:
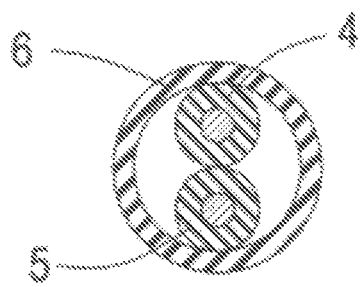
FIG. 3 shows an enlarged illustration of a section through FIG. 2 along line III-III.

A number of electrical lines 1 are laid in a vehicle F which is a sketched in FIG. 1, said lines being connected to a central unit 2 by way of one end and each being fitted with a sensor 3 at the other end.

A line 1 has at least two insulated electrical conductors 4 and 5—called "cores 4 and 5" in the text which follows—which are arranged in a plastic tube 6. The tube 6 may be composed, for example, of polyamide or polypropylene. In the preferred embodiment, two cores 4 and 5 are present in the tube 6. However, it is also possible for there to be more than two cores. The course of the tube 6 has, at previously defined points, parts 7 of a fastening device which integrally belong to said tube or are connected to said tube. Said parts are therefore generated at the same time as the tube 6 is produced. The parts 7 are spaced apart from one another in the axial direction of the tube 6, said distances corresponding to the distances between the fixed points in the vehicle F at which the respective line 1 is to be fastened.

The tube 6 is produced as a separate component, for example, by injection-moulding or by extrusion. The cores 4 and 5 are likewise produced using known technology. In order to produce the line 1, for example two cores 4 and 5 are drawn into a tube 6 which has a length which corresponds to the laying path. The sensor can be connected, for example electrically conductively, to one end of the cores 4 and 5 beforehand. A plug-type element can be connected to the cores 4 and 5, to which the tube 6 can also be fixed, at the other end of the line 1. Relative movement of cores 4 and 5 and also of the 6 can be precluded, even when the tube 6 does not surround the cores 4 and 5 so as to rest against them and form a seal. Each line 1 can be connected to the central unit 2, for example using the abovementioned plug-type element, before or after being mounted in the vehicle.

Figure 5:
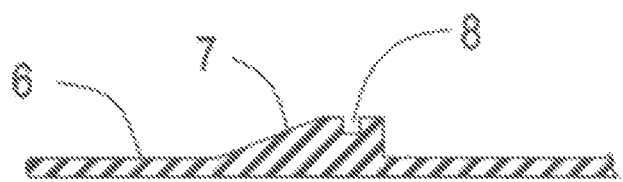
FIG. 5 shows an enlarged illustration of a detail of the tube used in the line according to FIG. 4.
Figure 4:
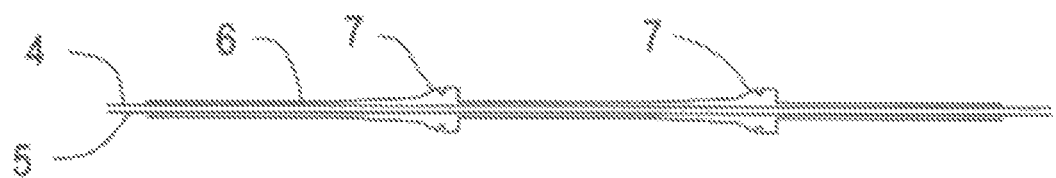
FIG. 4 again shows a schematic illustration of the line according to FIG. 2 in section.

The parts 7 of the fastening device which are provided on the tube 6 have, for example, the shape of a beak in accordance with FIGS. 4 and 5. They are closed around the tube 6 and project radially from said tube. Peripheral grooves 8 can be made in the parts 7, with fastening parts which are mounted on the fixed points of the vehicle F engaging in said grooves when the line 1 is mounted on the fixed points of the vehicle F, said fastening parts being designed, for example, as parts of a snap-action connection.

The distances between the parts 7 are—as already mentioned—variable. These distances depend on the positions of the fixed points in the vehicle F. In addition, the tube 6, likewise in accordance with the conditions in the vehicle F, can be thickened, that is to say have a greater wall thickness, at so-called abrasion points with spatial restriction. It is likewise possible for the walls thickness of the prefabricated tube 6 to likewise be reduced with spatial restriction at points at which said tube is intended to be particularly flexible. Such points are situated, for example; in the transition regions from the parts 7 to the tube 6.

The invention claimed is:

1. Electrical line for motor vehicles comprising:
    a prefabricated plastic tube, having a plurality of parts of fastening elements that integrally belong to the tube and are positioned in a spaced arrangement along the axial direction over the entire length of outside of the tube,
    at least two insulated electrical conductors which are inserted into the prefabricated plastic tube which together form one prefabricated electrical unit, wherein a sensor is connected at one end to the conductors of the unit before the conductors are inserted into the plastic tube,
    said plurality of parts of fastening elements on said tube are configured as fastening elements for fastening the completed plastic tube of said line to predefine fixed points of a motor vehicle.

2. The electrical line according to claim 1, wherein the wall thickness of the tube is increased at predefined, spatially restricted points.

3. The electrical line according to claim 1, wherein the wall thickness of the tube is reduced at predefined spatially restricted points.

* * * * *